United States Patent [19]

Wilmot et al.

[11] Patent Number: 4,964,591
[45] Date of Patent: Oct. 23, 1990

[54] PROJECTILE HAVING NONELECTRIC INFRARED HEAT TRACKING DEVICE

[75] Inventors: Donald W. Wilmot, Decatur, Ga.; Robert T. Taylor, Hampton, Va.

[73] Assignee: QuesTech, Inc., Falls Church, Va.

[21] Appl. No.: 338,276

[22] Filed: Apr. 14, 1989

[51] Int. Cl.[5] .............................................. F41G 7/26
[52] U.S. Cl. ................................................. 244/3.16
[58] Field of Search ...................... 244/3.1, 3.16, 3.21, 244/3.22

[56] References Cited

U.S. PATENT DOCUMENTS

| | | | |
|---|---|---|---|
| 3,041,011 | 6/1962 | Dhanes | 244/3.16 |
| 3,278,140 | 10/1966 | Evans | 244/14 |
| 3,502,285 | 3/1970 | Gambill | 244/3.22 |
| 3,645,475 | 2/1972 | Stipling | 244/3.22 |
| 3,740,003 | 6/1973 | Ayre et al. | 244/3.22 |
| 3,920,200 | 11/1975 | Evans et al. | 244/3.16 |
| 4,202,517 | 5/1980 | Young et al. | 244/3.22 |
| 4,413,795 | 11/1983 | Ryan | 244/3.22 |
| 4,532,853 | 8/1985 | Stangroom | 91/165 |

Primary Examiner—Charles T. Jordan
Attorney, Agent, or Firm—Joseph Scafetta, Jr.

[57] ABSTRACT

A nonelectronic device tracks and homes in on a target to be destroyed by a projectile having a body in which the device is carried. An optical lens disposed in a nose cone of the projectile body receives and focuses infrared radiation or heat from the target, which is an electromagnetic field that may be emanating from an exhaust plume of an incoming enemy intercontinental ballistic missile. A detector converts the radiation focused by the lens into thermal energy. A Golay-type cell receives the thermal energy and converts it into a fluid signal that is transferred via a nonelectronic coupler to a fluidic circuit. A fluidic rate gyro seeks the target and guides the projectile towards the target to be destroyed. A key advantage of the invention is that the nonelectronic infrared heat tracking device is comprised of inert mechanical elements and fluids. Therefore, the device is unaffected by intense magnetic and electromagnetic fields, except for those fields within the design band of the detector element. Thus, the detector element and the subsequent fluidic guidance circuits are not subject to damage when the nonelectronic tracking device is exposed to the intense EM fields that occur in rail gun launchers, microwave antisensor weapons, and the like, as is the case with conventional electronic trackers.

26 Claims, 2 Drawing Sheets

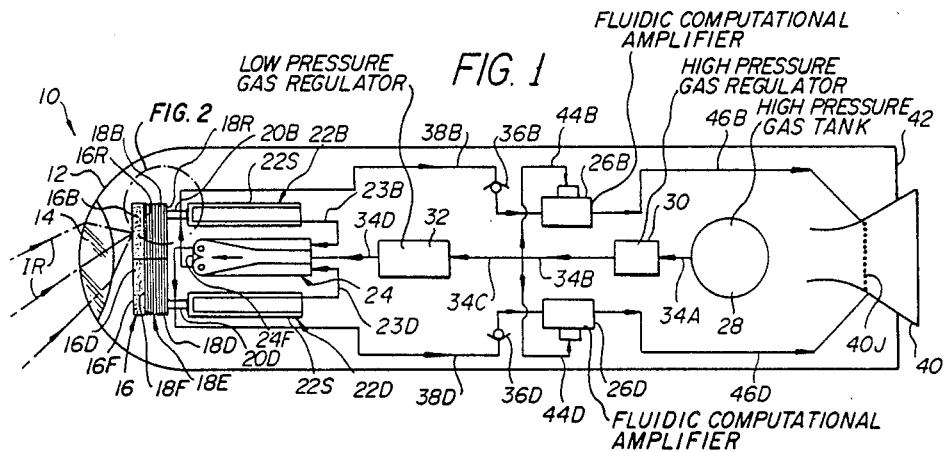
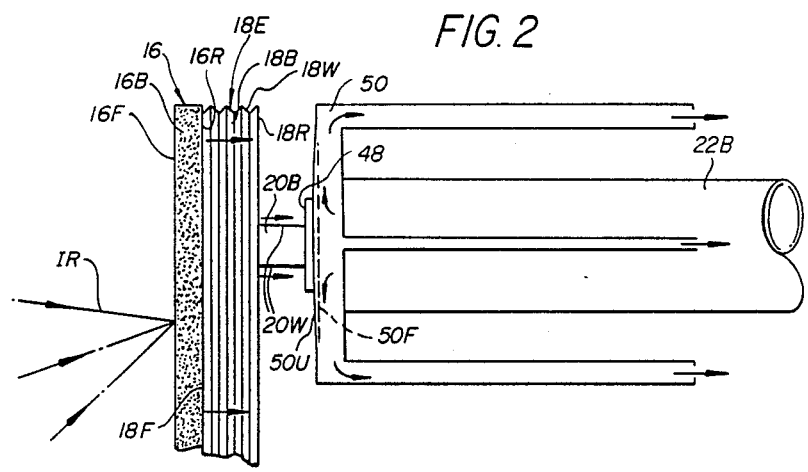

4,964,591

PROJECTILE HAVING NONELECTRIC INFRARED HEAT TRACKING DEVICE

BACKGROUND OF THE INVENTION

1. Field of the Invention

The invention relates to a projectile and, in particular, to a device for seeking, tracking, and homing in on a distant target to be destroyed. The target would be a source of electromagnetic (EM) energy, such as infrared radiation (IR) or heat, and would be detected by the device without the use of any electronic components.

2. Description of the Related Art.

Rail guns consisting of a mechanical track and a rapidly varying magnetic or EM field are contemplated as either launch platforms or launch mechanisms for unpowered kinetic energy projectiles which are targeted over hundreds or thousands of kilometers against enemy intercontinental ballistic missiles (ICBMs).

A major constraint in the development of the strategic defense initiative (SDI) for weapon systems is that a projectile must incorporate a homing guidance system capable of first finding and then striking the target. Semiconductor-based infrared sensors and electronics currently under consideration for these defensive weapon systems will be damaged by the highly intense EM field generated by the projection system itself.

The primary conventional solution to this problem is to shield the projectile electronics. However, the magnetic fields are so high that very thick, heavy materials are required to obtain adequate shielding. When these materials are applied and the projectile weight is thus increased, still higher EM fields are required to accelerate the projectile to the necessary launch velocity. Even if the basic problem is solvable by this shielding approach, the resulting defensive weapon is undesirable because of its consequent size and weight, the cost of the required rail gun to launch the projectile, and the fact that a multitude of such weapons must be deployed in continuously orbiting satellites and stations in outer space.

The secondary conventional solution to this problem is to employ nonsemiconductor electronics, which are still capable of being degraded to an unacceptable degree by an EM field. Thus, only fluidic systems appear to offer a viable solution. Examples of some fluidic systems used in projectiles, missiles, and the like, are disclosed in the following U.S. Pat. No.: 3,278,140 of Evans; 3,502,285 of Gambill; 3,645,475 of Stripling; 3,740,003 of Ayre, et al.; 3,920,200 of Evans, et al.; 4,202,517 of Young, et al.; 4,413,795 of Ryan; and 4,532,853 of Stangroom. However, none of these prior art devices embody the tracking of a distant target with fluidic sensors.

SUMMARY OF THE INVENTION

A projectile includes an optical element for focusing the source radiation onto a focal plane; a nonelectronic detector having an array of elements selected to optimize various critical functions, such as detection; a nonelectronic coupling mechanism; and a fluidic system that subsequently guides and controls various critical functions of the projectile.

A primary objective of the invention is to develop a sensor control system for a guided projectile that contains no electronics and is consequently invulnerable to highly intense EM fields and other interfering EM disruptions.

This objective and other advantages of the invention will become more readily apparent from an examination of the following brief description of the drawings and the subsequent detailed description of the preferred embodiments.

BRIEF DESCRIPTION OF THE DRAWINGS

FIG. 1 is a schematic view of a first embodiment of the present invention.

FIG. 2 is an enlarged detailed view of part of the first embodiment of a nonelectronic detector element and a subsequent coupling mechanism used in the present invention.

DETAILED DESCRIPTION OF THE PREFERRED EMBODIMENTS

Figure 3:
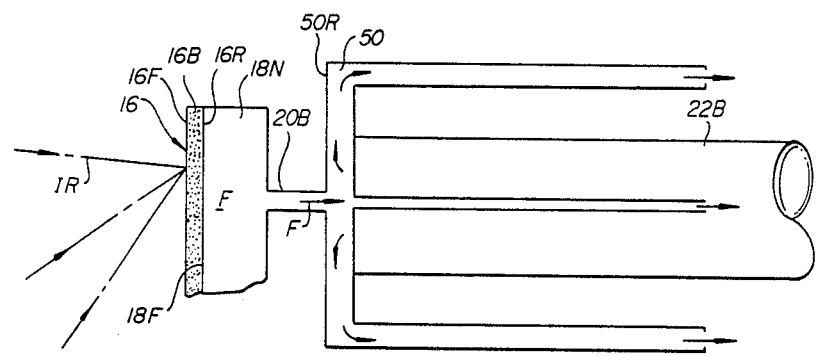
FIG. 3 is an enlarged detailed view of part of a second embodiment of the nonelectronic detector element and the subsequent coupling mechanism used in the present invention.

In FIG. 1, there is schematically shown a projectile body 10 having a front end that is a nose cone 12 in which there is disposed an optical lens 14 for receiving and focusing incoming infrared radiation IR from an EM source (not shown), such as an enemy ICBM, onto a focal plane defined by a front surface 16F of a nonelectronic detector element 16 disposed adjacent to the lens 14 in the nose cone 12. The element 16 detects only selected bands of the incoming radiation focused by the lens 14 when the front surface 16F absorbs the radiation received from the focusing lens 14. The element 16 is comprised of a plurality of cells, preferably four, arranged in a two-dimensional array. Only two such cells 16B and 16D are shown in side elevation in FIG. 1. This two-dimensional array of four cells is called a quad cell tracker. There is fixed to each cell at its rear surface 16R a front wall 18F of a pleated, expandable container 18E comprised of four metallic bellows, of which only two bellows 18B and 18D are shown in side elevation in FIG. 1. At its rear surface 18R, the expandable container 18E is connected to a plurality of rigid pipes, of which only pipes 20B and 20D are shown, for carrying hydraulic commands to a fluidic circuitry system. The element 16 and the container 18E together comprise a nonelectronic device for tracking and homing in on the EM source that is a target to be destroyed while the pipes 20B and 20D constitute a mechanism for coupling the nonelectronic device to the fluidic circuitry system that controls the directional flight and spatial orientation of the projectile body 10 toward the target. The fluidic circuitry system includes a plurality of fluidic transfer sensors, of which only sensors 22B and 22D are shown; a single central fluidic rate gyro 24 for seeking the target and guiding the projectile body 10 towards the target; a plurality of diaphragm amplifiers, of which only amplifiers 26B and 26D are shown; a single central high pressure gas tank 28; a high pressure gas regulator 30; and a low pressure gas regulator 32. The two regulators 30 and 32 are interposed in a fluid line having several segments 34A, 34B, 34C and 34D, extending from the gas tank 28 to the gyro 24. A plurality of check valves, of which only valves 36B and 36D are shown, are interposed in fluid lines 38B and 38D, respectively, which extend from a front surface 24F of the gyro 24 to the diaphragm amplifiers 26B and 26D, respectively. An exhaust nozzle 40 is secured in a base 42 of the projectile 10 and has a plurality of jets 40J around its inner surface for emitting high pressure gas from the tank 28 in order to redirect or reorient the projectile 10 in response to the hydraulic commands given by the gyro 24. These hydraulic commands may pass through various fluid lines, such as lines 46B and 46D connecting the diaphragm amplifiers 26B and 26D, respectively, to the plurality of jets 40J in the exhaust nozzle 40, in a manner to be described later when the operation of the projectile 10 is discussed.

FIG. 2 shows an enlarged detailed view of an encircled part of the first embodiment of the nonelectronic detector element shown in FIG. 1. The first embodiment of the detector cell 16B, shown in greater detail in FIG. 2, has at its rear surface 16R the front wall 18F of the expandable container 18E which, in turn, has at its rear surface 18R the rigid pipe 20B. When focused onto the front surface 16F of the detector cell 16B, the infrared radiation IR heats the cell 16B which, in turn, emits thermal energy through its rear surface 16R to heat the contiguous container 18E. As the fluid inside the container 18E expands, each corrugated wall 18W forming the container 18E unfolds so that the rear surface 18R of the container 18E exerts force through a hole that forms an open end of the rigid pipe 20B and presses against the walls 20W of the pipe 20B. Consequently, the rigid pipe 20B is pushed in a direction towards a solid plate 48 that closes an opposite end of the rigid pipe 20B. As pressure from the expanding pleated container 18E builds up, the solid plate 48 pushes, in turn, against a fluid-filled tube 50. In essence, the rigid pipe 20B and the solid plate 48 function as a mechanical device for coupling the container 18E to the fluidic circuit system. This tube 50 has a flexible front wall that is shown as a solid line 50U in its unflexed position and that is shown as a dashed line 50F in its flexed position. Since the fluidic system inside the transfer sensor 22B is a closed one, the pressure exerted by the flexed front wall 50F sends a wave through the tube 50 in the sensor 22B which transfers a fluid signal to the fluidic rate gyro 24 shown in FIG. 1.

FIG. 3 shows an enlarged detailed view of a second embodiment of the nonelectronic detector element 16 shown in FIG. 1. The second embodiment of the detector cell 16B, as shown in greater detail in FIG. 3, has at its rear surface 16R a nonexpandable container 18N which holds fluid F that communicates via the rigid pipe 20B through a rigid front wall 50R into the tube 50 of the fluid transfer sensor 22B In this embodiment, the pipe 20B is open at both ends so that the fluid F and the rigid pipe 20B together function as a fluid mechanical device for coupling the container 18N to the fluid circuit Likewise, the fluid F itself may be viewed as a coupler for the nonexpandable container 18N to the fluidic circuitry because the pipe 20B is rigid and does not move. Furthermore, the rigid pipe 20B itself may be considered a coupler for transferring the fluid signal from the container 18N to the fluidic circuit disposed next to the pipe 20B.

When focused onto the front surface 16F of the detector cell 16B, the infrared radiation IR heats the cell 16B which, in turn, emits thermal energy through its rear surface 16R to warm fluid F inside the nonexpandable container 18N. As the fluid F expands, some of it flows into the pipe 20B which leads through the rigid wall 50R into the tube 50. Since the fluidic system inside the transfer sensor 22B is a closed one, the pressure exerted by the expanding heated fluid F sends a wave through the tube 50 of the sensor 22B which transfers the fluid signal to the fluidic rate gyro 24 shown in FIG. 1. In this manner, the fluidic circuit receives and interprets the fluid signal so that the projectile 10 is controlled and guided to the target to be destroyed.

The operation of the detector element 16 will now be described for the second embodiment of the invention with reference to FIG. 4. Incoming infrared radiation IR from an EM source (not shown) is focused by the optical lens 14 onto the front surface 16F of the detector element 16 which is a quad cell tracker composed of four cells 16A, 16B, 16C and 16D. In this particular example, the infrared radiation IR is focused on the third cell 16C. As the infrared radiation IR heats the cell 16C, some of the thermal energy generated is emitted through the rear surface 16R to warm the fluid inside the nonexpandable container 18N. As just described in regard to FIG. 3, the fluid F behaves in a manner which causes the fluid transfer sensor 22B to send a signal to the fluid gyro 24 shown in FIG. 1. Thus, essentially, the nonexpandable container 18N receives thermal energy and converts it into a fluid signal in the fluidic circuit.

Returning briefly to FIG. 1, it may be seen that the gyro 24 controls the flow of high pressure gas from the tank 28. This gas is emitted through the jets 40J of the nozzle 40 in a selected pattern so that either the direction or the orientation of the projectile 10 is changed. Returning now to FIG. 4, it may be seen that, as the direction and the orientation of the projectile 10 changes, the point of impact of the infrared radiation IR focused by the optical lens 14 on the front surface 16F of the detector element 16 continues to change and approach a center point O, which is seen only in FIG. 4. Under the control of the fluid gyro 24, the projectile 10 will be constantly redirected and reoriented by controlled emissions through the jets 40J in the nozzle 40 until the infrared radiation IR from the EM source is focused by the optical lens 14 on the center point O. This centering of infrared radiation IR on the point O has an equal effect on all four cells 16A–16D of the quad cell tracker. As can be imagined from FIG. 3, the equal amounts of the fluid F emitted into each pipe 20A–20D leading from the container 18N have equivalent effects that cancel each other out in the gyro 24 so that no additional redirecting and reorienting of the projectile 10 takes place In other words, when the infrared radiation IR is focused on the center point O, the fluid gyro 24 reads the fluid signals from the four cells 16A–16D as an indication that the projectile 10 is homed in and on track towards its intended target, i.e., the EM source which could be the exhaust plume of an incoming enemy ICBM.

The operation of the fluidic control system schematically shown in FIG. 1 will now be described. With reference to the upper half of FIG. 1, the fluid signal leaves the transfer sensor 22B and enters line 23B which leads directly into the gyro 24 that processes the incoming signal and sends an hydraulic command out through line 38B, through check valve 36B, and into the amplifier 26B. In accordance with the hydraulic command coming through line 38B from the gyro 24, the amplifier 26B adjusts the expansion of the high pressure gas which has come from the tank 28 through line 34A, the high pressure regulator 30, line 34B, and line 44B, before such gas is released through line 46B into the jets 40J of the nozzle 40 for either redirecting or reorienting the projectile 10.

Similarly, as shown in the lower half of FIG. 1, a fluid signal, created by the expandable container 18E and passed through the pipe 20D into the transfer sensor 22D, enters line 23D which leads directly into the gyro 24, where the incoming signal is processed. An hydraulic command is sent out through line 38D, through check valve 36D, and into the amplifier 26D which adjusts the expansion of the high pressure gas that has come from the tank 28 through line 34A, the high pressure regulator 30, line 34B, and line 44D. The gas is then released through line 46D into other jets 40J inside the nozzle 40 so that the projectile 10 is redirected or reoriented in a manner different than either the redirection or reorientation made by the fluid signal sent by the other transfer sensor 22B just described with reference to the upper half of FIG. 1.

As can be seen schematically from FIG. 1, the high pressure gas in the tank 28 is constantly monitored and controlled through a pilot line 34D by the low pressure regulator 32 which receives a portion of such gas through lines 34B and 34C from the high pressure regulator 30.

Now that a detailed description of the two preferred embodiments shown in FIGS. 1–4 has been completed, a general description of various alternative embodiments for each element of the invention will be undertaken.

To insure that any selected alternative embodiment may be substituted for anyone of the preferred embodiments, it should be kept in mind that the EM source on the object to be tracked may be emitting infrared, visible, ultraviolet, or microwave radiation. This EM radiation must be emitted at a wavelength capable of being focused by the optical lens 14. Also, the EM radiation must be capable of being absorbed and converted to the thermal energy at the surface 16F of the detector element 16.

In regard to the optical lens 14, an antenna or an infrared element capable of focusing the radiation from the EM source onto a focal plane of the surface 16F may be substituted therefor. The selection of other components for any alternative embodiment is diverse. Such selected components may be identical or analogous to similar components incorporated within conventional optical or nonelectronic systems.

Although an ancillary optical, infrared or microwave system placed in front of the detector element 16 or an array system thereof may cooperate with the invention, such a system is not shown in the drawings. Such a system may incorporate additional elements, either fixed, rotating, or otherwise articulated, such as wedges, prisms, or reticles which are placed within the ancillary optical, infrared or microwave system in front of the detector element 16.

Figure 4:
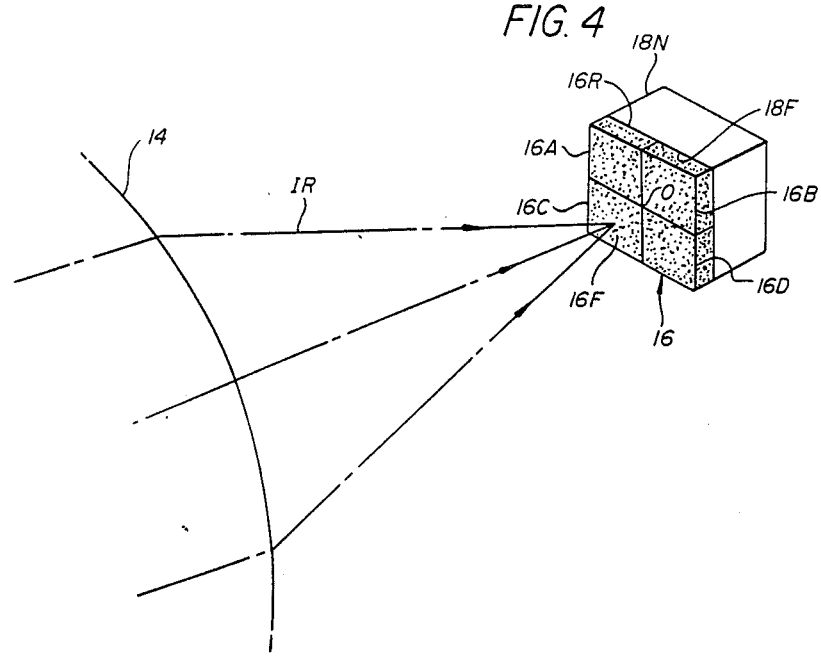
FIG. 4 is a perspective view of a part of the second embodiment having an optical focusing lens and an array of elements selected to optimize detection by the present invention.

In regard to the detector array system exemplified by the quad cell trackers 16A-16D best shown in FIG. 4, there may be substituted therefor a multiplicity of other detecting elements from two to an indefinite number N arranged in a two-dimensional array. The sizes, elemental dimensions, spacings, and patterns should be selected to optimize various critical functions, such as detection, angular tracking, homing, spatial discrimination, spectral discrimination, avoidance of other EM sources, noise reduction, and clutter discrimination. The sizes, dimensions, spacings, and patterns include variants of all conventional optical, infrared, and microwave tracking configurations, such as but not limited to staring, fixed-pattern arrays, spin and conscan reticle-related techniques, uses of monopulse amplitudes, point-versus-area target spatial filtering, and the like.

The combination of the nonelectronic detector element 16 and its intimate nonelectronic coupling via the container 18 and the pipes 20 to the subsequent fluidic guidance system controlled by the fluid gyro 24 constitutes a central concept of the invention.

The detection process involves the absorption of the focused energy by the nonelectronic, energy-absorbing element 16, appropriately selected to handle the spectral EM band known to be emitted by the targeted source. The energy-absorbing element 16 converts the EM energy to thermal energy and transfers this thermal energy by either conduction, convection, or radiation via either the expandable container 18E or the nonexpandable container 18N to a fluid confined therein The fluid may be either a gas or a liquid.

The criteria for a usable fluid are threefold: first, it must be capable of absorbing the thermal energy from the initial energy-absorbing element 16; second, it must expand in a definable proportion to the amount of thermal energy absorbed; and third, either it must be usable as a working fluid in fluidic computational amplifiers 26B and 26D and subsequent control circuits, or it must be capable of coupling by a variety of implementations to a second fluid that will function as the working fluid both in the amplifiers 26B and 26D and in the subsequent fluidic control circuit.

On the front surface 16F of the nonelectronic detector element 16, the absorbing material for the infrared, optical, and near-ultraviolet EM bands is a substance, such as carbon black. For the microwave EM band, various other absorbing materials and coatings may be applied to the front surface 16F. These materials are the types already used in other applications, such as echo-free or so-called anechoic chambers.

In the first preferred embodiment shown in FIGS. 1 and 2, the sealed but pleated container 18E that is filled with expandable air is similar in function to a little known device called a Golay Cell. Such a cell has been used previously in simple detection processes but has never been applied or suggested for use with complex tracking and homing devices.

More importantly, the process of directly coupling the air or the fluid F, confined within either the expandable container 18E or the nonexpandable container 18N, respectively, and the information conveyed as signals by the expansions and contractions of either the air or the fluid F to the fluidic guidance system controlled by the gyro 24, is not known to exist in the prior art.

It may be initially difficult for those persons skilled in the pertinent art to believe that a Golay-type cell, such as the containers 18E and 18N, may feasibly serve as an element directly coupled at its front wall 18F to the quad cell trackers 16A-16D and indirectly coupled at its rear surface 18R to a fluidic guidance system because of the usual slow response time and the low sensitivity of the Golay Cell.

Historically, other detection elements, either semiconductor-based, such as photoconductive or photovoltaic materials, or otherwise electronic-based, such as bolometers, quickly replaced Golay Cells for practical infrared sensing applications. However, an array of complex problems have arisen in modern defense weapon systems because semiconductive materials and electronic circuits in general may be destroyed or interferred with by electromagnetic, magnetic, and electrostatic fields. The EM and other fields in question are associated with microwave weapons, nuclear bursts, and rail-gun propulsion systems.

For certain applications in which such fields have the potential for destroying the semiconductor junctions or other electronic elements of traditional homing sensors, or where such fields induce undesirable spurious signals into missile tracking electronic elements, the Golay-type cell coupled either by fluid or mechanically to a fluidic control system offers a potentially viable missile guidance system. Because all subsequent processing and control circuits are comprised entirely of fluids and inert solid materials, this system is invulnerable as a detector to EM damage and disruption.

The low detection sensitivity to the signal from the target and the relatively slow response time of the Golay-type cell restrict the use of this invention to scenarios where the target signature is relatively intense and the angular dynamics of the projectile engaging the target is sufficiently slow. Many IR missile-homing scenarios do not have sufficiently intense targets. However, both ICBM long-range scenarios, wherein rail gun fields are an issue, and close-in, i.e. terminal, phases of tactical anti-air missile engagements, wherein microwave missile defense weapons are an issue, exhibit sufficient intensity for the Golay-type cell to be viable.

The traditionally slow response time of the Golay-type cell can be enhanced by modern manufacturing technology. However, it will always be substantially slower than equivalent electronic systems. Both tactical and strategic missile scenarios frequently require missile guidance and control response times of milliseconds, or only slightly longer. Hence, many missile applications are within the reach of Golay-type cell response times.

Traditional IR homing systems operate with substantially faster response times in order to implement various signal processing algorithms, either within the focal plane or in subsequent electronic elements. Typically, these processing steps are oriented towards the rejection of scene clutter, such as clouds, and the recognition of countermeasures, such as decoy flares. Because Golay-type cell systems are limited in the temporal processing they can achieve, they will rely on such other parameters as spectral discrimination to accomplish these functions. Although they will typically be less capable in this regard than equivalent electronic systems, certain of the scenarios requiring invulnerability of the projectile to intense environmental or weapon-level EM fields are less demanding of clutter rejection. This fact is true for either parallel or an upward aspect attack on a rising ICBM and is also true for the terminal homing phase of a tactical missile attack, wherein the requirements for sensitivity, clutter discrimination, and decoy rejection in the initial and middle course phases of the attack are considerably relaxed.

As previously mentioned, the initial infrared radiation detection and conversion to information occurs when such infrared radiation is absorbed by the front surface 16F of the detector element 16 and converted into thermal energy. Thereafter, the first so-called nonelectronic coupling occurs when such thermal energy is transferred by either conduction or convection or radiation from the rear surface 16R of the detector element 16 to the first working fluid which may be either a liquid or a gas, or even a solid that undergoes a phase change, to either a liquid or as a gas when the thermal energy, i.e. heat, is transferred into it. This first working fluid is selected such that its pressure may be defined as a mathematical function of the amount of thermal energy or heat transferred. The mathematical function, even if a proportionality, need not be either linear or continuous; it must simply be definable and predictable. For instance, a phase change-type system may exhibit a binary dependence. Exemplary first working fluids would be either the air confined within the expandable container 18E shown in FIGS. 1 and 2, or the fluid F selected for use within the nonexpandable container 18N shown in FIGS. 3 and 4.

In any embodiment, the information to be learned from the radiation emitted from the EM source is capsulized as energy which goes through transformation. First, at the entrance to the lens 14, shown in FIGS. 1 and 4, the incoming energy arrives as EM radiation or a stream of photons striking at an angle. Second, after passing through the lens 14, the incoming energy may be characterized as photons having a known density at a given position in the space between the lens 14 and the front surface 16F of the detector element 16. Third, after striking the front surface 16F of the detector element 16, the energy is absorbed and becomes embodied in photons varying in intensity over the time spent on the front surface 16F of the detector element 16. Fourth, upon absorption, the energy is carried in a thermal form through the detector element 16 and exits from the rear surface 16R into the front wall 18F of either the expandable container 18E or the nonexpandable container 18N. Fifth, upon transfer of the energy in its thermal form as heat from the front wall 18F into the first working fluid held in either the expandable container 18E of FIGS. 1 and 2, or the nonexpandable container 18N of FIGS. 3 and 4, the information to be learned is capsulized in the pressure of the first working fluid.

For a Golay-type cell, the first working fluid is the air confined within the pleated container 18E which expands, as suggested by the arrows in FIG. 2, when the pressure from the heated air increases. This expansion of the pleated container 18E mechanically affects the pipe 20B, the plate 48, and the second working fluid within the flexible tube 50, so that the fluid signal sent to the gyro 24 shown in FIG. 1 is read as the information conveyed by the infrared radiation from the EM source. Note that, if the guidance system controlled by the fluid gyro 24 of the projectile 10 were not coupled to the Golay-type cell, the information conveyed by the radiation from the EM source could be read either in terms of degrees of increased temperature on the energy-absorbing front surface 16F or in terms of millimeters of distance traveled by the expanding walls 18W of the pleated container 18E.

Consequently, the nonelectronic coupling mechanism may follow either of the two alternative embodiments previously described, i.e. first, the first working fluid enclosed within the pleated container 18E that has a mechanical influence by its expansion upon a second working fluid enclosed within the guidance system, as best shown in FIG. 2, or second, a single working fluid that is continuous between the nonexpandable container 18N and the pipe 20B leading to the tube 50 of the fluidic guidance system, as best shown in FIG. 3.

The first embodiment is analogous to the Golay Cell in which the working fluid is confined within the expandable container 18E and any increase in internal fluidic pressure is transformed into a mechanical displacement which can be measured for the wall 18W. This displacement is measured when it is sensed either by a known mechanical instrument, such as a pair of calipers, or by a second working fluid that processes and amplifies the mechanical displacement, as suggested by the embodiment in FIGS. 1 and 2, before conveying the learned information via the tube 50 for use by the gyro 24 of the fluidic guidance system.

In the second embodiment of the nonelectronic coupling mechanism, shown in FIG. 3, a single working fluid is held in a nonexpandable container 18N and any change in internal fluidic pressure is measured directly downstream in the fluidic guidance system by the central gyro 24 that processes the information conveyed by the tube 50 for use within the closed fluidic loop comprising the guidance system. Processes initiated by the fluidic gyro 24 include, but are not limited to, amplification, integration, differentiation, comparisons, and activation of directional control jets 40J in the exhaust nozzle 40.

Examples of strategic defensive weapon movements that may require such directional control jets for reorienting the projectile 10 around to change its line of travel include the following motions: first, "racheting" by a space-based "smart rock" interceptor to follow an enemy ICBM from its launch pad into a zone of proximity that will initiate a defensive strike thereagainst; second, repositioning of an air foil on an already airborne missile so that it changes its choice of incoming targets; and third, angularly displacing the heat-seeking head contained within a gimbal system so that the projectile carrying it may be inclined freely in any direction. In the third application, the gimbals involved may be completely nonelectronic, as in a simple gyroscopic system. Alternatively, the gimbals may be electromechanical, but only if the higher voltage and current amperage levels involved in their implementation use rugged electronic components that do not suffer from any significant susceptibility to magnetic, electrostatic, or EM fields which would dictate the utilization of the nonelectronic tracker of this invention initially.

Besides its use in strategic defense weapons, the present invention may also be incorporated in some tactical offensive missiles where there is a premium on the lack of vulnerability to an enemy's electronic countermeasures. Furthermore, the present invention may be used in other offensive weapons, such as ICBMs, that must be invulnerable to high energy microwave beams aimed at them and also must be able to perform in intense nuclear environments caused by missiles and bombs that have already detonated and that are creating enormous EM fields which would ordinarily burn out the electronic components and sophisticated equipment aboard incoming ICBMs still approaching other nearby enemy targets.

To describe a key advantage of the present invention quite simply, this nonelectronic tracker has no sensitivity whatsoever to EM fields.

The foregoing preferred embodiments are considered illustrative only. Numerous other modifications will readily occur to those persons skilled in the pertinent missile technology after reading the foregoing disclosure. Consequently, the disclosed invention is not limited by the exact structures and operating processes shown and described above but rather is defined by the claims appended hereto.

We claim:

1. A projectile for destroying a target, comprising:
   (a) a body having a front end;
   (b) a nonelectronic means, disposed in the front end of the body, for tracking and homing in on the target;
   (c) a fluidic circuit means, disposed in the body, for controlling flight of the body towards the target; and
   (d) a means for coupling the nonelectronic means to the fluidic circuit means.
2. The projectile, according to claim 1, wherein: said nonelectronic means is a Golay-type cell.
3. The projectile, according to claim 1, wherein: said fluidic circuit means includes a fluidic rate gyro means for seeking the target and for guiding the body towards the target.
4. The projectile, according to claim 1, wherein: said coupling means is a mechanical device.
5. The projectile, according to claim 1, wherein: said coupling means is a fluid mechanical device.
6. The projectile, according to claim 1, wherein: said coupling means is a fluid.
7. A projectile for destroying a target, comprising:
   (a) a body having a front end;
   (b) means, disposed in the front end of the body, for focusing radiation from the target;
   (c) nonelectronic means, disposed in the body, for detecting the radiation focused by the focusing means;
   (d) a fluidic circuit means, disposed in the body, for controlling flight of the body towards the target; and
   (e) means for coupling the nonelectronic means to the fluidic circuit means;
   whereby the projectile is insensitive to an electromagnetic field.
8. The projectile, according to claim 7, wherein: said focusing means is an optical lens.
9. The projectile, according to claim 7, wherein: said nonelectronic means is a Golay-type cell.
10. The projectile, according to claim 7, wherein: said fluidic circuit means includes a fluidic rate gyro means for seeking the target and for guiding the body towards the target.
11. The projectile, according to claim 7, wherein: said coupling means is a mechanical device.
12. The projectile, according to claim 7, wherein: said coupling means is a fluid mechanical device.
13. The projectile, according to claim 7, wherein: said coupling means is a fluid.
14. A nonelectronic device for tracking and homing in on a target to be destroyed by a projectile, said device comprising:
   (a) means for receiving radiation from the target;
   (b) detector means, disposed adjacent to the receiving means, for converting the radiation to thermal energy;
   (c) container means, arranged contiguous to the detector means, for receiving the thermal energy and converting said thermal energy into a fluid signal;
   (d) coupler means, positioned in communication with the container means, for transferring the fluid signal; and
   (e) a fluidic circuit means, disposed next to the coupler means, for receiving and interpreting the fluid signal so that the projectile is controlled and guided to the target to be destroyed.

15. The nonelectronic device, according to claim 14, wherein:
  said receiving means includes an optical lens means for focusing radiation from the target.

16. The nonelectronic device, according to claim 14, wherein:
  said detector means includes
  (i) a surface means for absorbing the radiation from the receiving means; and
  (ii) a two-dimensional array of detector elements.

17. The nonelectronic device, according to claim 16, wherein:
  said absorbing surface means contains carbon black.

18. The nonelectronic device, according to claim 16, wherein:
  said two-dimensional array of detector elements is a quad cell tracker.

19. The nonelectronic device, according to claim 14, wherein:
  said container means is expandable and is filled with air.

20. The nonelectronic device, according to claim 19, wherein:
  said container means has corrugated walls.

21. The nonelectronic device, according to claim 14, wherein:
  said container means is nonexpandable and is filled with a working fluid.

22. The nonelectronic device, according to claim 14, wherein:
  said coupler means includes a pipe open at one end and a plate means for closing an opposite end of the pipe.

23. The nonelectronic device, according to claim 14, wherein:
  said coupler means is a pipe open at both ends.

24. The nonelectronic device, according to claim 14, wherein:
  said fluidic circuit means includes a fluidic rate gyro.

25. In a projectile having a body and being capable of destroying a target, an improvement comprising:
  (a) a nonelectronic means, disposed in the body, for tracking and homing in on the target; and
  (b) a fluidic circuit means, disposed in the body and coupled to the nonelectronic means, for controlling flight of the body towards the target.

26. The improvement according to claim 25, wherein:
  said nonelectronic means is a Golay-type cell.

* * * * *

UNITED STATES PATENT AND TRADEMARK OFFICE
CERTIFICATE OF CORRECTION

PATENT NO. : 4,964,591

DATED : October 23, 1990

INVENTOR(S) : Donald W. Wilmot et al.

It is certified that error appears in the above-identified patent and that said Letters Patent is hereby corrected as shown below:

On the cover page, left col., section [54], line 1, "NONELECTRIC" should be --NONELECTRONIC--;

left col., section [51], line 1, delete "5"; and left col., section [56], line 6, "Stipling" should be --Stripling--.

Col. 1, line 2, "NONELECTRIC" should be --NONELECTRONIC--;

line 49, "No." should be --Nos.--;

line 51, delete the commas(,) (third and sixth occurrences); and line 52, delete the comma(,) (third occurrence).

Col. 3, line 1, "are" should be --is--;

line 52, after "22B", insert a period (.); and line 56, after "cuit", insert a period (.).

UNITED STATES PATENT AND TRADEMARK OFFICE
CERTIFICATE OF CORRECTION

PATENT NO. :   4,964,591

DATED      :   October 23, 1990

INVENTOR(S) :  Donald W. Wilmot et al.

It is certified that error appears in the above-identified patent and that said Letters Patent is hereby corrected as shown below:

Col. 4,   line 50, after "place", insert a period (.).

Col. 5,   line 32, "anyone" should be --any one--.

Col. 6,   line 19, after "therein", insert a period (.).

Signed and Sealed this

Third Day of September, 1991

Attest:

HARRY F. MANBECK, JR.

*Attesting Officer*   Commissioner of Patents and Trademarks